United States Patent [19]

Hida et al.

[11] Patent Number: 5,032,332
[45] Date of Patent: * Jul. 16, 1991

[54] PROCESS FOR MAKING A SILICON CARBIDE WHISKER REINFORCED ALUMINA CERAMIC COMPOSITE PRECURSOR

[75] Inventors: George T. Hida, North Tonawanda; Jonathan Mironi, Williamsville, both of N.Y.

[73] Assignee: Benchmark Structural Ceramics Corporation, Amherst, N.Y.

[*] Notice: The portion of the term of this patent subsequent to Feb. 5, 2008 has been disclaimed.

[21] Appl. No.: 254,108

[22] Filed: Oct. 6, 1988

[51] Int. Cl.$^5$ .................... C04B 35/10; C04B 35/56
[52] U.S. Cl. ........................... 264/65; 501/89; 501/95; 264/66
[58] Field of Search .............. 501/95.89, 95.81; 264/66, 65; 423/345, 645

[56] References Cited

U.S. PATENT DOCUMENTS

| | | | |
|---|---|---|---|
| 1,918,317 | 7/1933 | Benner et al. | 501/88 |
| 2,854,364 | 9/1958 | Lely | 148/1.5 |
| 2,862,795 | 12/1958 | Lowe | 23/208 |
| 2,886,454 | 5/1959 | Todd | 106/43 |
| 3,375,073 | 3/1968 | McMullen | 23/204 |
| 3,704,230 | 11/1972 | Loricchio | 252/182 |
| 4,069,060 | 1/1978 | Hayashi et al. | 106/65 |
| 4,284,612 | 8/1981 | Horne, Jr. et al. | 423/345 |

OTHER PUBLICATIONS

"Study of Solid-State Aluminothermal Reactions: Influence of Activation and Moderation Processes", George T. Hida (Thesis, Israel Institute of Technology, Haifa, Israel, Apr., 1987).

Primary Examiner—Mark L. Bell
Assistant Examiner—Deborah Jones
Attorney, Agent, or Firm—Howard J. Greenwald

[57] ABSTRACT

A process for preparing a ceramic composite material containing alpha silicon carbide whiskers is disclosed.

In the process, a slurry containing non-aqueous liquid and aluminum material, amorphous carbon, and silica is provided. This slurry is thereafter pelletized, the pellets are dried, the dried pellets are preheated, and the preheated pellets are then ignited. The ignited pellets undergo an exothermic reaction, forming the composite containing alpha silicon carbide whiskers.

The composite material is heat-treated by first heating it to a temperature of 900–1100 degrees centigrade at a rate of 8–15 degrees per minute, and then heating it to a temperature of 1,250–1,350 degrees centigrade at a rate of 2–5 degrees per minute.

10 Claims, 1 Drawing Sheet

FIG.1

PROCESS FOR MAKING A SILICON CARBIDE WHISKER REINFORCED ALUMINA CERAMIC COMPOSITE PRECURSOR

FIELD OF THE INVENTION

A process for preparing a ceramic composite precursor by a combustion synthesis process.

BACKGROUND OF THE INVENTION

Ceramic composites comprised of silicon carbide whiskers and alumina powder are well known to the prior art. However, one problem with the ceramic composites presently available is that they cost from about eighty to about one hundred and twenty dollars per pound, a price which makes them too expensive for most applications.

One of the reasons said composites are so expensive is that silicon carbide whiskers require a substantial amount of energy to produce. Thus, as is disclosed in U.S. Pat. No. 3,375,073 of McMullen, in the manufacture of silicon carbide a mixture of sand and coke is usually reacted in an Acheson-type electric resistance furnace at a temperature of about 2000-2600 degrees centigrade for from about 80 to about 120 hours.

An exothermic reaction for the production of silicon carbide is desirable. However, as is known to those skilled in the art, such exothermic reactions are difficult to obtain and control. Thus, for example, U.S. Pat. No. 2,886,454 of Todd discloses that " . . . certain exceedingly troublesome problems and limitations are encountered in any attempt to produce metal carbides of acceptable properties by exothermic procedures." (column 1, lines 68-71). At column 2 of his patent, Todd discloses that "For such an exothermic reaction to be successful, it must produce a sufficiently high temperature to result in the formation of a carbide mass, it being necessary that the temperature exceed the melting point of the carbide product by several hundred degrees. It has been found that most mixtures of metal oxides, aluminum and carbon that would occur to a person skilled in the art fail completely to produce a carbide mass, and more often than not, when such a mixture is repeatedly varied until finally a mass is produced, the mass contains too much aluminum in addition to the metal carbides or for some other reason lacks the properties required in a product for the present purposes."

One possible exothermic method for the production of silicon carbide was disclosed in applicant George Hida's thesis. Hida's thesis discussed the possibility of producing silicon carbide dendrites together with alumina powder in a single step reaction. In this thesis, which was entitled "Study of Solid-State Aluminothermal Reactions: Influence of Activation and Moderation Processes," which was submitted to the Senate of the Technicron—Israel Institute of Technology in Haifa, Israel in February of 1987, and which was published in April of 1987, a reaction was disclosed in which three moles of silica were reacted with four moles of aluminum and three moles of carbon. The silica reagent used was 200/230 mesh fraction quartz sand; the aluminum reagent used was −325 mesh aluminum powder; and the carbon reagent used was carbon black. Stoichiometric amounts of these reagents, based upon the use of three moles of silica, four moles of alumina, and three moles of carbon, were mixed; the mixture was compacted by cold pressing it in a die; and the pressed samples were placed in a furnace which had been preheated to 720 degrees and were thereafter ignited.

Hida's thesis cited references indicating that, in his process, the presence of carbon reduced the exothermicity. See, e.g., Walton, J. D. and Poulos, N. E., "Cermets from Thermite Reactions," Journal of the American Ceramic Society, Vol. 42, No. 1, pp. 40-49, January 1959. Also see Cutler, R. A., "Synthesis of Submicron Silicon Carbide," presented at the DARPA/ARMY Symposium on Self-Propagating High Temperature Synthesis, Daytona Beach, Fla., U.S.A., October, 1985. Also see references numbers 37, 38, 48, 57, and 67 cited in said thesis.

When the process and stoichiometry suggested in Hida's 1987 thesis is used to prepare silicon carbide whiskers, a relatively low yield (usually about 10 percent) of such whiskers is obtained.

It is an object of this invention to provide an improved exothermic process for preparing a silicon carbide whisker/alumina composite precursor in high yield at a cost which is substantially cheaper than is currently possible.

SUMMARY OF THE INVENTION

In accordance with this invention, there is disclosed a process for preparing a ceramic composite which is comprised of alpha silicon carbide whiskers. The first five steps of this process are the invention of applicant George T. Hida. The subsequent steps of this process are the invention of applicants George T. Hida and Jonathan Mironi.

In the first step of this process, a slurry is provided which is comprised of from about 80 to about 92 volume percent of solid material and from about 20 to about 8 volume percent of a non-aqueous liquid. The solid material comprises from about 17 to about 22 weight percent of aluminum, from about 19 to about 24 weight percent of amorphous carbon, and from about 56 to about 65 weight percent of silica. The aluminum has a specific surface area of from about 0.2 to about 1.1 square meters per gram, has a particle size distribution which ranges from about 4 to about 28 microns, and has at least 80 weight percent of its particles in the range of from about 6 to about 12 microns. The amorphous carbon has a specific surface area of at least 4 square meters per gram. This slurry is provided by a process in which a non-aqueous liquid is mixed with a source of carbon monoxide. Thereafter, the silica is mixed with the mixture of non-aqueous liquid and the carbon monoxide source to produce a silica slurry containing from about 35 to about 55 volume percent of solids. Thereafter, the silica slurry is mixed with sufficient amounts of aluminum and carbon to produce a slurry whose solid material is comprised of from about 17 to about 22 weight percent of aluminum, from about 19 to about 24 weight percent of amorphous carbon, and from about 56 to about 65 weight percent of silica. Thereafter, the silica slurry is dried until its solids content is from about 80 to about 92 volume percent.

In the second step of the process, the slurry is pelletized in order to provide a multiplicity of pellets.

In the third step of the process, the pellets are dried to a moisture content of from about 0.1 to about 2.0 percent.

In the fourth step of the process, the dried pellets are preheated to a temperature of from about 200 to about 300 degrees centigrade.

In the fifth step of the process, the preheated pellets are ignited with an ignition source at a temperature of at least 600 degrees centigrade. The ignited pellets undergo an exothermic reaction at a temperature of from about 1700 to about 2300 degrees centrigrade in which the combustion wave propagates at a rate of from about 0.1 to about 1.5 centimeters per second. The combustion of the pellets produces a composite which contains alpha silicon carbide and alumina.

In the sixth step of the process, the composite is heated to a temperature of from about 900 to about 1,100 degrees centigrade at a rate of from about 8 to about 15 degrees per minute.

In the seventh step of the process, the temperature of the composite is raised from its temperature of from about 900 to about 1,100 degrees centigrade to a temperature of from about 1,250 to about 1,350 degrees centigrade at a rate of from about 2 to about 5 degrees per second.

DESCRIPTION OF THE DRAWING

The present invention will be more fully understood by reference to the following detailed description thereof, when read in conjunction with the attached drawing, wherein.

DESCRIPTION OF THE PREFERRED EMBODIMENTS

In the process of this invention, a composite of alpha silicon carbide whiskers (as reinforcement) and alpha aluminum oxide (as matrix material) is obtained with a substantially higher yield of the silicon carbide component than was heretofore available by an aluminothermic reduction process followed by in situ synthesis of silicon carbide. Thereafter, this composite is heat-treated.

THE FIRST FIVE STEPS OF THE PROCESS OF THIS INVENTION

The first five steps of the process of this invention were invented by applicant George T. Hida. In the first section of this case, these first five steps will be described. In the second section of this case, the remaining steps (which are the invention of applicants George T. Hida and Jonathan Mironi) will be described.

The term whisker, as used in this specification, refers to a needle-like single crystal of metallic and nonmetallic compounds; this crytalline form possesses very good strength properties, approaching maximum theoretical strength and making it suitable for reinforcement of metal, ceramic, glass, or polymer matrices. The term silicon carbide whiskers, as used in this specification, refers to single crystals in needle-like form containing at least 90 weight percent of the alpha silicon carbide phase, having a diameter of from about 0.1 to about 3 microns, having a length of at least about 10 microns, and having an aspect ratio of less than about 1:10. The term aspect ratio means the ratio of the diameter (or the equivalent diameter) of the whisker, divided by its length. In one preferred embodiment, the aspect ratio of the whisker is less than about 1:20.

The silicon carbide whiskers comprising the composite of this invention can have different cross-sectional shapes. Thus, e.g., they may be circular, square, rectangular, hexagonal, and the like. When the whisker has a substantially circular cross-sectional shape, then its diameter will be from about 0.1 to about 3.0 microns and, preferably, from about 0.5 to about 1.5 microns. When the cross-sectional shape of the whisker is not substantially circular, then it will have an equivalent diameter of from about 0.1 to about 3.0 microns and, preferably, from about 0.5 to about 1.5 microns.

The silicon carbide whiskers comprising the composite of this invention consist essentially of alpha silicon carbide. As is known to those skilled in the art, the crystalline structure of silicon carbide derives from the diamond structure in which half of the carbon atoms are replaced by silicon atoms. Each atom is surrounded tetrahedrally by four different atoms and linked with them by covalent bonds. Alpha silicon carbide is a modification of the crystalline structure having a hexagonal crystalline network with several arrangements coexisting within the same conditions of temperature and pressure and called polytypes. See, e.g., pages 486 to 488 of R. Abramovici's "Materii Prime Ceramice," (Institutul Politechnic, Traian Vuia, Timisoara, Romania, 1974). Also see pages 366–367 of the McGraw-Hill Encyclopedia of Science & Technology, Volume 12 (McGraw-Hill Book Company, New York, 1977). The disclosures of each of these publications are hereby incorporated by reference into this specification.

The composite produced by the process of this invention is also comprised of alpha aluminum oxide. As used in this specification, the term alpha aluminum oxide refers to the most stable form of aluminum oxide, which is also called "corundum". See, e.g., pages 331–332 of said Abramovici book.

THE MATERIALS USED IN THE PROCESS OF THE INVENTION

In the process of this invention, a multiplicity of pellets are prepared from a specified slurry. Each of these pellets, and the slurry from which they are prepared, have a specified ratio of silica, aluminum, and carbon, and they contain certain amounts of such silica, aluminum, and carbon. The materials used to prepare such slurry and pellets are described below.

The pellets and slurry used in the process of this invention contain from about 17 to about 22 weight percent of aluminum material selected from the group consisting of aluminum and aluminum alloy, by total weight of silica, aluminum, and carbon in the pellets. It is preferred that the pellets comprise from about 17.5 to about 19 weight percent of aluminum, by weight of silica, aluminum, and carbon.

The aluminum or aluminum alloy should be in powder form and will have a specific surface area of from about 0.2 to about 1.1 square meters per gram and, preferably, from about 0.6 to about 0.7 square meters per gram.

Either pure aluminum, aluminum alloy material, or mixtures thereof may be used. Suitable aluminum alloys include, for example, alloys of aluminum with lithium, silicon, magnesium, manganese, iron, and the like.

In one embodiment, the aluminum material used is in the form of fine aluminum flakes. Thus, by way of illustration, one may use fine aluminum flakes obtainable from the Riedel de Haen Company of West Germany (catalog number 110100). This material is a coated aluminum comprised of 94 percent aluminum and less than 0.1 percent of oxygen; and at least about 80 percent of these flakes are smaller than 9 microns.

In the pellets and slurry used in the process of this invention, the specified weight ratio of aluminum is based upon the concentration of pure aluminum. When an aluminum alloy material is used, or when a mixture of aluminum and aluminum alloy material is sued, the aluminum content of the alloy is first calculated, and this aluminum content may then be used to determine the aluminum content of the pellet and/or the slurry.

The particle size distribution of the aluminum material will range from about 4 to about 28 microns and, preferably, will be from about 6 to about 12 microns. Particle size analysis may be conducted by means well known to those skilled in the art. Thus, for example, one can use the procedure described on pages 8-2 to 8-8 of Perry and Chilton's "Chemical Engineers' Handbook," Fifth Edition (McGraw-Hill Company, New York, 1973). The Perry and Chilton book also describes the specific surface area test described elsewhere in this specification (see, e.g., page 8-7); the disclosure of the entire Perry and Chilton book is hereby incorporated by reference into this specification. Test methods are also described in the 1988 Annual Book of ASTM Standards, Section 02, Volume 02.05 (ASTM, 1916 Race Street, Philadelphia, Pa., 1988), the disclosure of which is hereby incorporated by reference into this specification.

At least about 80 weight percent of the aluminum particles will have diameters of from about 6 to about 12 microns. It is preferred that at least about 85 weight percent of the aluminum particles have a diameter of from about 6 to about 12 microns. In an even more preferred embodiment, at least about 90 weight percent of the aluminum particles have a diameter of from about 6 to about 12 microns.

In one embodiment, the aluminum material contains from about 0 to about 1.0 percent, by weight of aluminum material, of combined oxygen. As used in this specification, the term combined oxygen refers to oxygen which is combined with aluminum and/or aluminum ally and, usually, is in the form of a metal oxide. The amount of combined oxygen is determined by evaluating the total oxygen present by conventional means such as, e.g., spectral analysis.

The pellets and the slurry used in the process of this invention are also comprised of amorphous carbon. These materials comprise from about 19 to about 24 weight percent, by total weight of silica, aluminum, and carbon, of amorphous carbon. It is preferred that they comprise from about 21 to about 24 weight percent of amorphous carbon, by total weight of silica, aluminum, and carbon.

By way of illustration, one can use carbon black obtained from the Pelleter Company of the United States (code "SRF") which has a specific surface area of 27.1 square meters per gram and is comprised of 99.28 percent of carbon, 0.37 percent of hydrogen, 0.03 percent of sulfur, 0.25 percent of ash, and 0.07 percent of oxygen. By way of further illustration, one can use amorphous carbon obtainable from the Aldrich Chemical Company, Inc. of 940 West Saint Paul Avenue, Milwaukee, Wis. and sold as code 27,720-7 in the 1988-1989 Aldrich catalog.

It is essential that the carbon used in the process of this invention be amorphous and have a specific surface area of at least about 4 square meters per gram. The specific surface area may be determined by means well known to those skilled in the art. Thus for example, specific surface area, or the surface area per unit mass of material (square meters per gram) can be measured by using gas adsorption techniques via the well known BET equation. This measurement can be conducted on a Micromeritics Flow Sorb II 2300, model 2300/00000/00 (made by Micromeritics Company, Norcross, Ga.). The test procedure is described in the instruction manual for this machine (see, e.g., Manual P/N: 230/42804/00, published by Micromeritics in 1985). As is known to those skilled in the art, this measurement also may be conducted on the Monosorb model MS-4 single point analyzer or the Quantosorb QS-7 multi-point analyzer, both of which are manufactured by the Quantachrome Corporation of 6 Aerial Way, Syosset, N.Y. 11791.

In one preferred embodiment, the amorphous carbon contains less than about 1.5 percent, by weight of carbon, of combined sulfur. The amount of combined sulfur may be determined by means well known to those skilled in the art. Thus, by way of illustration, one can use the combustion method described on pages 9-4 to 9-5 of said Perry and Chilton's "Chemical Engineers' Handbook."

The pellets and the slurry used in this invention are also comprised of from about 56 to about 65 weight percent of silica, by total weight of silica, aluminum, and carbon in the pellet. Preferably, these materials comprise from about 58 to about 61 weight percent of silica, by total weight of silica, aluminum, and carbon.

By way of illustration, a suitable silica which may be used in the process of this invention is "Cab-O-Sil M-5" Fumed Silica, an amorphous silicon dioxide manufactured by the Cabot Corporation, Cab-O-Sil Division, of Tuscola, Ill. 61953; this silica has a specific surface area of 200 plus or minus 25 square meters per gram; and the total oxygen content of this silica indicates that it contains less than 1.0 percent of silicon-silicon bonds.

The silica used in the process of this invention preferably has a specific surface area of from about 1.2 to about 400 square meters per gram and, more preferably, from about 50 to about 300 square meters per gram. In an even more preferred embodiment, the specific surface area of the silica is from about 125 to about 250 square meters per gram. In the most preferred embodiment, the silica has a specific surface area of from about 175 to about 225 square meters per gram.

The silica used can be either amorphous or crystalline. As used in this specification, the term amorphous refers to a solid substance which, although it may possess microcrystals, does not indicate the existence of any crystalline structure with X-ray diffraction. Even though the amorphous material may possess some degree of crystallinity, such crystallinity is less than that required for detection with X-ray diffraction technology. Thus, for example, a solid material which does not crystallize and which does not possess definite geometrical shape (as determined by X-ray diffraction analysis) is amorphous within the meaning of this invention.

The term crystalline, as used in this invention, indicates a substance which, when subjected to X-ray diffraction analysis, indicates the presence of crystals.

It is preferred that the silica used in the process of this invention be amorphous. It is also preferred that the silica contain less than about 1.0 percent, by total weight of silica, of silicon-silicon bonds. The extent to which the silica contains silicon-silicon bonds may be determined by analyzing the total oxygen content of the silica; to the extent, if any, that the total oxygen content is less than stoichiometric, silicon-silicon bonds are present, and the extent to which they are present can be calculated.

In one preferred embodiment, the pellets and the slurry of this invention are comprised of from about 1 to about 5 percent, by weight of silica, aluminum, and carbon, of a source of carbon monoxide. This carbon monoxide source is designed to generate carbon monoxide when it is subjected to a temperature of from about 700 to about 1,600 degrees Centigrade for no more than about 1.0 milliseconds. Suitable sources of carbon monoxide include fatty acids containing from about 10 to about 24 carbon atoms which can be monocarboxylic or dicarboxylic. Suitable fatty acids include acids such as caprylic acid, capric acid, lauric acid, myristic acid, palmitic acid, stearic acid, oleic acid, linoleic acid, erucic acid, brasidic acid, elaidic acid, stearolic acid, mixtures thereof, and the like. Other sources of carbon monoxide include fats corresponding to said fatty acids.

Stearic acid is a preferred source of carbon monoxide. By way of illustration, one suitable stearic acid may be obtained from the Aldrich Chemical Company of 940 West Saint Paul Avenue, Milwaukee, Wis. (catalog number 17,536-6 of the 1986-1987 Aldrich catalog).

In one preferred embodiment, the pellets and the slurry used in the process of this invention are comprised of from about 1 to about 5 weight percent, by combined weight of silica, aluminum, and carbon, of a source of hydrogen fluoride. In a more preferred embodiment, from about 2 to about 4 weight percent of the source of hydrogen fluoride is present. In the most preferred embodiment, about 3 percent of the source of hydrogen fluoride is present in the reaction mixture.

The source of hydrogen fluoride is designed to generate hydrogen fluoride when subjected to a temperature of from about 200 to about 400 degrees centigrade for about 1 to about 20 minutes. Potassium hydrogen fluoride is a suitable source of hydrogen fluoride, and it may be obtained, e.g., from Alfa Products, Thiokol Ventron Division, 152 Andover Street, Danvers, Mass. (catalog number 89714). By way of illustration and not limitation, other suitable sources of hydrogen fluoride include any material which will contain the bifluor ion [$HF_2$] such as, e.g., sodium hydrogen fluoride, ammonium hydrogen fluoride, and the like.

In one preferred embodiment, the pellets and the slurry of this invention are comprised of from about 0.1 to about 1.0 percent (by weight of silica, aluminum, and carbon) of a metal-containing component selected from the group consisting of ferric oxide, ferro-ferric oxide, manganese dioxide, and titanium dioxide. It is preferred to use from about 0.5 to about 1.0 weight percent of this metal-containing component. In the most preferred embodiment, said component is selected from the group consisting of ferric oxide and manganese dioxide.

By way of illustration, one may use a ferric oxide obtained from the Research Organic/Inorganic Chemical Corp. of 9068 DeGramo Street, Sun Valley, Calif. 913252.

In one especially preferred embodiment, the pellets and the slurry of this invention are comprised of the specified amounts of silica, aluminum, and carbon (each by total weight of pellet) and, additionally, the specified amounts of the source of carbon monoxide, the source of hydrogen fluoride, and the metal-containing component.

In one preferred embodiment, the pellets and the slurry are also comprised of a source of gaseous silicon carbide which, when exposed to the high temperature generated during the reaction, will produce silicon carbide in the gaseous phase.

In one preferred embodiment, the sources of hydrogen fluoride and/or iron are first mixed with the carbon, and this mixture is thereafter mixed with the silica and the aluminum. In this embodiment, it is preferred to grind the carbon and the sources of hydrogen fluoride and/or metal-containing component in a jar mill to homogenize the mixture and to slightly agglomerate them. Thus, for example, the mixture can be ground for from about 1 to about 2 hours with alumina grinding media.

The specified amounts of silica, aluminum, carbon, and sources of carbon monoxide, hydrogen fluoride, and metal-containing component are pelletized in order to prepare a multiplicity of pellets with a specified size. These pellets are substantially spherical, although other, irregularly-shaped pellets also may be used. The pellets used in the process of this invention will preferably have a maximum dimension of about 12 millimeters, although pellets with larger maximum dimensions also can be used. The pellets used will have a minimum dimension of about 4 millimeters. Thus, in the preferred embodiment where spherical pellets are used, the diameter of these pellets will range from about 4 to about 12 millimeters and, preferably, from about 6 to about 10 millimeters.

THE PREFERRED PROCESS OF THE INVENTION

Figure 1:
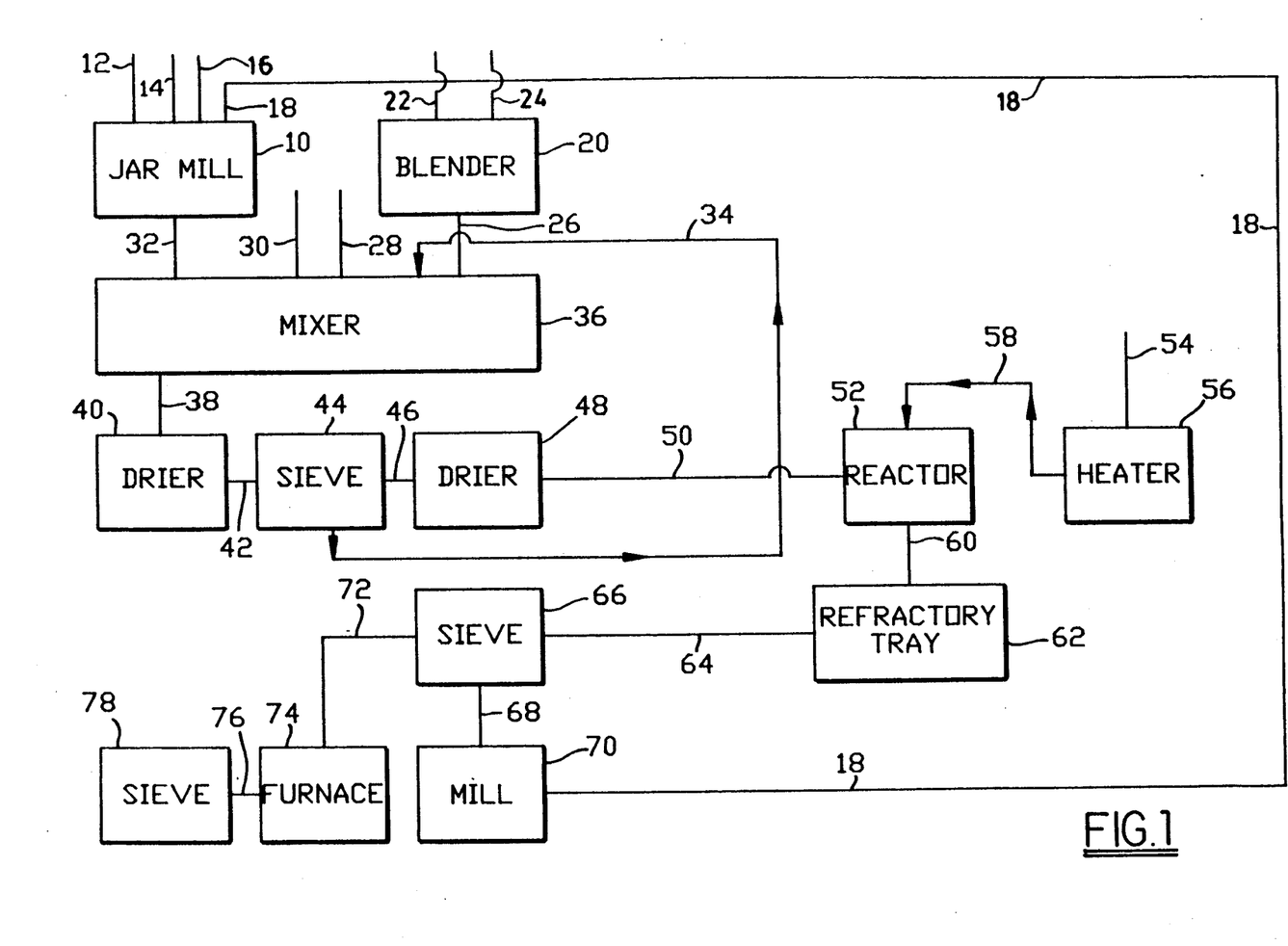
FIG. 1 is a flow chart illustrating the preferred process of this invention.

Referring to FIG. 1, a preferred process for preparing the pellets of this invention is disclosed. In this process, a specified slurry is first prepared, and it is thereafter pelletized.

In the first step of the process, a slurry is provided which is comprised of from about 60 to about 80 volume percent of solid material and from about 40 to about 20 volume percent of non-aqueous liquid. The solid material in the slurry is comprised of from about 17 to about 22 weight percent of the aforementioned aluminum, from about 19 to about 24 weight percent of the aforementioned carbon, from about 56 to about 65 weight percent of the aforementioned silica, and from about 1 to about 5 weight percent of the aforementioned source of carbon monoxide.

The slurry provided in the first step of the process is prepared by a process involving the sequential steps of mixing a non-aqueous liquid with a source of carbon monoxide, mixing silica with the non-aqueous liquid/carbon monoxide source mixture to produce a silica slurry, mixing aluminum and carbon with the silica slurry, and drying the silica/aluminum/carbon slurry thus produced to a solids content of from about 80 to about 92 volume percent.

The first step in making the slurry is to mix non-aqueous liquid with a source of carbon monoxide. The non-aqueous liquid preferably is volatile at a temperature of about 80 degrees Centigrade. This non-aqueous liquid may be either a flammable or a nonflammable solvent.

It is preferred to use a non-aqueous liquid which volatilizes at a temperature of about 60 degrees Centigrade.

Suitable flammable non-aqueous solvents include acetone, benzene, toluene, n-petroleum ether, and the like. Thus, by way of illustration and not limitation, one can use the petroleum ethers identified as reagents 32,044-7, 26,173-4, 30,031-4, and 18,451-9 on page 1183 of the 1988-1989 Aldrich catalog. 200 milliliters of the petroleum ether may be charged to blender 20 via line 22.

In one embodiment, nonflammable, non-aqueous solvents are used. Such suitable solvents include carbon tetrachloride, carbon disulfide, and the like.

Referring to FIG. 1, a carbon agglomerate is milled in mill 10, the non-aqueous solvent/carbon monoxide source is mixed in blender 20, and the components of the slurry produced are fed via lines 26, 28, 30, and 32 to mixer 36.

A carbon agglomerate is prepared in jar mill 10. To jar mill 10 is fed amorphous carbon via line 12, ferric oxide via line 14, and potassium hydrogen fluoride via line 16. Other mills also can be used instead of jar mill 10; thus, e.g., one can use the mills described on pages 8-25 to 8-45 of said Perry and Chilton's handbook.

The carbon may be mixed with any source of metal-containing component used, any source of hydrogen fluoride, used, and any moderator (described later on in this specification) used until a homogeneous carbon agglomerate is obtained in mill 10. In this step, the carbon, the source of metal-containing component, and/or the source of hydrogen fluoride, and/or the moderator are ground in the mill. It is preferred to homogenize these materials for from about 1 to about 2 hours in a jar mill with alumina grinding media. However, other grinding media, grinding devices, and grinding times can be used to obtain a similarly homogenized mixture. The homogenized carbon agglomerate mixture is characterized by having a grey uniform color without any visible red spots or white spots.

One amorphous carbon which can be used is Huber Corporation's pelletized carbon black, type N990; 19 grams of such carbon can be charged to mill 10. One ferric oxide which can be used is Pfizer Corporation's synthetic iron oxide type R-2199; 0.5 grams of this ferric oxide can be charged to mill 10. One potassium hydrogen fluoride which can be used is Aldrich Corporation's reagent number 23,928-3 (also referred to as potassium bifluoride); 3.0 grams of this reagent can be charged to ball mill 10.

In one embodiment, a ground moderator (described later on) is fed to mill 10 via line 18; 10 grams of moderator can be fed to the mill. This moderator may contain about 0.1 percent (by weight of moderator) of fatty acid such as, e.g., oleic acid. It should be noted that the oleic acid, e.g., can act as both a moderator (added in mill 10) and/or a source of carbon monoxide (added in blender 20).

It is preferred that jar mill 10 contain sintered alumina grinding media. The reagents in jar mill 10 should be ground for about 2.0 hours at a speed of about 90 r.p.m. to produce a homogeneous mixture which has a uniform grey color and no visible red or white spots.

The non-aqueous solvent/carbon monoxide source mixture is prepared in blender 20. Into blender 20 should be fed a non-aqueous solvent such as, e.g., petroleum ether via line 22. A fatty acid, such as stearic acid, may be fed into the blender via line 24. It is critical to prepare a non-aqueous solvent/stearic acid mixture prior to the time the silica is mixed with non-aqueous solvent.

One stearic acid which may be used is obtainable from Aldrich Corporation and is identified as reagent 17-536-6; 4 grams of this stearic acid may be charged to blender 20. The petroleum ether and the stearic acid may be blended at a speed of about 1500 r.p.m.

After the mixture of the non-aqueous liquid and stearic acid has been prepared in blender 20, it is thereafter mixed with silica.

All of the silica is mixed with a sufficient amount of the mixture of non-aqueous solvent and stearic acid to prepare a well-dispersed silica slurry with a solids content of from about 35 to about 55 volume percent and, preferably, from about 40 to about 50 volume percent. The mixing may be effected by means well known to those skilled in the art. Thus, by way of illustration and not limitation, one may use any of the mixing processes and/or apparatuses described on pages 21-30 to 21-36 of Perry and Chilton's "Chemical Engineers' Handbook," Fifth Edition, supra, the disclosure of which is hereby incorporated by reference into this specification. Thus, e.g., one can mix the silica and the solvent with an Eirich mixer.

Those skilled in the art are familiar with the Eirich machines and their use in mixing solids and/or pelletizing. Reference may be had, e.g., to an article entitled "Mixing Techniques and Mixing Equipment," first published in Aufberteitungs-Teklchnick 1976 and republished in publication 10052-us-2000-683 by Eirich Machines Ltd. of 521 Fifth Avenue, New York, N.Y., the disclosure of which is hereby incorporated by reference into this specification. Reference also may be had to other Eirich publications entitled "Eirich Intensive Mixers—The complete range of mixers"(GM 885-4us), "Eirich Intensive Mixer for vacuum or pressure operation (Edition 35 e/486), "Eirich Type R Intensive Mixer," and the like. Each of these publications is hereby incorporated by reference into this specification.

The silica is preferably mixed with the non-aqueous liquid mixture for from about 10 to about 30 minutes until a well-mixed slurry is obtained.

Into mixer vessel 36 is fed the blend from blender 20 via line 26, silica via line 28, aluminum powder via line 30, the ground mixture from mill 10 via line 32, and recycled material via line 34. As used in this specification, the term recycled material refers to the material which passes through both of the pelletizing sieves and, thus, has a diameter of less than about 4 millimeters; this recycled material is reintroduced into the slurry via line 34.

The petroleum ether mix from blender 20 is mixed with the silica prior to the time any other reagents are contacted with either the silica or the petroleum ether mix; it is critical that the silica be mixed with non-aqueous solvent mixture prior to the time it is mixed with either the aluminum material and/or the carbon.

200 milliliters of the mix from blender 20 may be mixed with 60 grams of silica. A suitable silica introduced via line 28 is Cabot Corporation's Cab-O-Sil Fumed Silica Type M-5.

The mixing may occur in a mixer other than mixer vessel 36; in the embodiment shown in FIG. 1, the mixing occurs in mixer 36. Suitable mixers are described on pages 19-3 to 19-23 of said Perry and Chilton's handbook.

The petroleum ether mix and the silica should be mixed at a speed of about 160 r.p.m. for about 30 minutes until the silica is well dispersed.

After the well dispersed silica slurry has been prepared, it may be mixed with aluminum powder, which is added via line 30. A suitable aluminum powder is Alcoa Corporation's atomized aluminum powder, grade 6401.18 grams of this aluminum powder may be added via line 30 to the reaction mixture.

At the same time that the aluminum powder is added to the reaction mixture, or thereafter, the carbon mixture from mill 10 may be added through line 32 and/or the recycled material may be added through line 34. In general, up to about 20 grams of recycle material may be added through line 34.

After the well-mixed silica/solvent slurry has been prepared, then the aluminum and the ground carbon agglomerate is added to the slurry. It is preferred to add these materials to the vessel in which the silica slurry is present. This vessel is preferably a closed vessel so that, during mixing of the slurry, volatile solvent does not escape from it.

The silica/aluminum/carbon agglomerate/solvent mixture thus prepared is then preferably mixed in a closed vessel for at least about 2 hours and, preferably, for from about 2 to about 4 hours. Any of the mixers described above can be used to stir this mixture. In one preferred embodiment, in addition to being closed, the mixing vessel is also leakproof. In one embodiment, the reaction mixture is mixed at a speed of 160 r.p.m. for about 4 hours.

Once all the reagents have been added to mixer 36 and mixed, they may be discharged from mixer vessel 36 and passed via line 38 to drier 40, where the slurry is partially dried.

Suitable dryers known to those skilled in the art may be used to dry the slurry. Thus, for example, one may use the dryers described on pages 20-4 to 20-58 of said Perry and Chilton's handbook.

The slurry is partially dried to a moisture content of from about 8 to about 20 percent, by weight. It is preferred to dry the slurry to a moisture content of from about 12 to about 16 percent, by weight.

The partially dried slurry is then pelletized. It may be pelletized by means well known to those skilled in the art. Thus, by way of illustration and not limitation, one can use the methods and apparatuses described on pages 8-61 to 8-62 of Perry and Chilton's "Chemical Engineers' Handbook," Fifth Edition. Thus, e.g., one can use the Eirich machines described above.

In an especially preferred embodiment of this invention, the pellets of this invention are prepared by a wet-mixing process.

Separation of solids by screening and sieving is well known to those skilled in the art and is described, e.g., on pages 21-37 to 21-44 of said Perry and Chilton's "Chemical Engineers' Handbook," supra, the disclosure of which is hereby incorporated by reference into this specification. As is known to those skilled in the art, the size of the sieve openings used will dictate what size pellets will be obtained from the dried slurry.

In one preferred embodiment, illustrated in FIG. 1, the partially dried slurry is passed via line 42 to twin vibratory sieve 44, wherein it is pelletized. In this embodiment, two sieves are sued to pelletize the slurry and produce the pellets of this invention. The slurry is first passed through a top sieve with sieve openings of from about 8 to about 14 millimeters and, preferably, openings of from about 10 to about 12 millimeters. The slurry which passes through this top sieve is then contacted with a bottom sieve with sieve openings of 4 millimeters. The pellets used in the process of this invention are formed between the top sieve and the bottom sieve.

The material passing through the bottom sieve of twin vibratory sieve 44 can be recycled via line 34 into mixer 36 and reslurried therein.

The pelletized material from sieve 44 is passed via line 46 to drier 48. In the drier, the pellets are dried to a moisture content of from about 0.1 to about 2.0 percent, by weight. In general, the pellets are dried at a temperature of about 80 to about 100 degrees centigrade for about 2 hours.

The dried pellets are transferred via line 50 to reactor 52, which is equipped with an igniter. In one preferred embodiment, in such reactor, the pellets are first subjected to a preignition, low-temperature heat treatment step.

In the preheating step, the dried pellets are then poured into a reactor and preheated while under an atmosphere selected from the group consisting of air, nitrogen, or inert gas. The pellets are preheated to a temperature of from about 200 to about 300 degrees centigrade; it generally takes no longer than about 40 minutes before the pellets reach this temperature. In general, the preheating is conducted for a period of from about 10 to about 40 minutes and, preferably, from about 15 to about 25 minutes. It is preferred to conduct the preheating in an inert atmosphere. Suitable inert gases include argon, helium, and the like. The most preferred inert gas is argon. Mixtures of the above inert gases also can be used.

Once the pellets have been preheated to a temperature of from 200 to about 300 degrees centigrade, they are ignited. It is preferred that the gas used in the ignition system, which preferably is inert, be at ambient pressure, although slight deviations from ambient pressure are allowable.

In one preferred embodiment, the dried pellets are preheated while under nitrogen atmosphere. In this embodiment, it is preferred to heat the nitrogen to a temperature of about 400 degrees centigrade, pass it into the reactor, and contact it with the pellets in order to preheat them. Thus, nitrogen is fed via line 54 into heater 56, wherein it is heated to a temperature of 400 degrees centigrade and thereafter fed via line 58 into reactor 52 wherein it is contacted with the pellets.

In another embodiment, not shown, the pellets are ignited without being subjected to the preignition low-temperature heat treatment step.

The pellets are then ignited. Any suitable source of heat, such as a spark, a flame, a beam, a hot wire, and the like, can be used to ignite the pellets. In general, the ignition source must be at a temperature of at least about 600 degrees centigrade and, preferably, from about 600 to about 800 degrees centigrade.

Once the pellets have been ignited, they burn spontaneously in a self-sustaining reaction which produces a substantial amount of heat. In general, the reaction wave propagates at a rate of from about 0.1 centimeters per second to about 1.5 centimeters per second. The reaction time is a function of the amount of pellets being combusted. The reaction temperature is generally from about 1700 to about 2300 degrees centigrade.

In one preferred embodiment, the pellets are ignited with a hot wire. A chromel-alumel hot wire which is red hot and at a temperature of at least about 800 degrees centigrade is used to ignite the pellets. Once the pellets are ignited, the ignition point is transformed into a reaction front which consumes at a velocity of from about 0.1 to 1.5 centimeters per second.

The reacted pellets are then discharged via line 60 to refractory tray 62, wherein they are allowed to cool under ambient conditions to a temperature of from about ambient to about 200 degrees centigrade.

The cooled pellets are then passed via line 64 to four-deck vibratory sieve 66. The vibratory sieve 66 preferably has at least four sieves which sequentially screen and/or treat the combusted pellets and a collecting pan beneath the finest sieve.

The first screen in the vibratory sieve, into which the combusted pellets are first discharged, is 2.5 mesh (8 millimeters sieve opening). Material which passes through this sieve is then passed to the second vibratory sieve.

The second screen in the vibratory sieve is 16 mesh (1 millimeter sieve opening). It is preferred to locate rubber rings in the bottom of said sieve; these rings are solid rubber and are about 1.0 inch in diameter. The rubber rings gently crush the pellet material. Material which passes through the second sieve is passed to the third vibratory sieve.

The third vibratory sieve is 28 mesh (0.6 millimeter opening). The bottom of this sieve also contains 1.0 inch diameter rubber rings to assist in gently crushing the pellet material. Material which passes through this third sieve is primarily silicon carbide whisker material and alumina powder and alumina agglomerates, and it passes to the fourth vibratory sieve.

The fourth vibratory sieve is 60 mesh (0.25 millimeter opening). The material which passes through this sieve is collected on the bottom pan. This material is a mixture of dispersed silicon carbide whiskers in alumina powder.

The desired silicon carbide whisker material, which is collected on the pan, is a composite precursor comprised of from 39 to 54 percent of alpha silicon carbide (by weight of silicon carbide and alumina), from about 46 to about 33 percent of alumina, and from about 12 to about 15 percent (by weight of composite precursor) of other materials preferably comprised of one or more of silicon oxy-carbide, silicon subcarbides, silicon-silicon dioxide solutions, aluminum-mono and sub-silicates, and mixtures thereof. A substantial portion of these other materials are convertible to silicon carbide and/or alumina with heat treatment. The silicon carbide material in the composite precursor comprises at least 80 weight percent (by weight of silicon carbide) of silicon carbide whiskers.

If material remains on the first sieve and/or second sieve and/or third sieve, it is passed via line 68 to mill 70 where it is ground, preferably together with 0.1 percent (by weight) of oleic acid until it will pass a 325 mesh sieve, and the ground material is then passed via line 18 to ball mill 10. The materials remaining on the first sieve (2.5 mesh), if any, together with the material remaining on the second sieve (16 mesh), if any), and together with the material remaining on the third sieve (20 mesh), if any, can be used as possible moderator material. In case the proportion of remaining material is less than the necessary quantity for moderation, a fraction of the material remaining on the fourth sieve (60 mesh) can be added.

The material passing through the fourth sieve, together with the material accumulated on the bottom pan, is a ceramic composite precursor comprised of silicon carbide whiskers and aluminum oxide powder; it may be hot-pressed into ceramic articles.

In one embodiment, the composite material from the fourth sieve and the bottom pan is passed via line 72 to furnace 74, where it is heat-treated. The heat-treated material from furnace 74 is thereafter passed via line 76 to vibratory screen 78.

In one embodiment of this invention, a process is provided in which pellets are prepared from said silica, said aluminum, and said carbon agglomerate in precisely the manner described above with with exception: from about 5 to about 15 weight percent (by total weight of pellet) of a moderator are used to prepare pellets. With the exception of the addition of the moderator prior to pelletizing to the silica/aluminum/carbon mixture, ever other aspect of the prior process is the same.

In this embodiment, it is preferred to add from about 8 to about 12 weight percent of the moderator (by total weight of pellet) to the silica/aluminum/carbon mixture. It is most preferred to add about 10 weight percent of the moderator to the mixture.

The moderator is preferably ground with the carbon, the source of metal-containing component, and the source of hydrogen fluoride (if any) to prepare the carbon agglomerate. Thereafter, as before, the carbon agglomerate is mixed with the silica slurry and the aluminum.

As indicated above, the moderator may be the silicon carbide whisker/alumina composite. Alternatively, or additionally, the moderator may be silicon carbide only, alumina only, mixtures of silicon carbide and alumina, other inert materials, etc. Suitable inert materials include, e.g., graphite powder or fiber, and refractory ceramic oxide or non-oxide materials.

Without wishing to be bound to any particular theory, applicant believes that moderation permits control of the reaction and the use of thermal energy freed during the process. Any possible means of moderation should have the capacity of slowing down the reaction rate in some degree and influencing one of the elementary processes of the reaction kinetics (such as the chemical process proper, the diffusion of reactants, nucleation, and crystal growth of products).

Moderation may be achieved by a decrease of the reaction rate caused by a reduction in the surface energy of the reactants. Such a reduction can be caused by increasing grain sizes, covering the grains with a thin layer of inert oxide, or adsorption on the reactant surface of a mono- or poly-molecular layer of a surface-active agent.

Moderation may be achieved by partial absorption of the energy generated by the reaction. This absorption can occur in a fluidized bed reaction with continuous injection and cyclic ignition; in this embodiment, the thermal energy obtained is rapidly removed from the system and can be used for other purposes. This adsorption can occur with the introduction of inert substances which do not react with either the reactants or the products but absorb part of the thermal energy released during the reaction; these substances are mixed in the reactant composition and undergo physical transformations (melting or sublimation) or chemical transformation (decomposition or combustion). This absorption can be effected by introduction of chemically inert substances which do not react with either the reactants or products but interpose themselves between the reactants.

The moderator substance may act by densifying the reaction product and, by that, reducing the reactant diffusion rate. Alternatively, the moderator may aggregate the more mobile reactant, causing it to diffuse from the interior to the surface of the inert substance and only after that through the product layer to the reaction zone.

Moderation may result from introduction of active substances which enter into weak exothermic or even mildly endothermic reactions with the reaction product. In this case, one may obtain valuable secondary products sintering jointly with the main reaction products. One may create an oxidizing, reducing, or inert environment in the course of the reaction, simultaneously increasing the pressure under which the reaction takes place.

Moderators may be grouped according to their reaction mode. Thus, one classification is moderators which leave the system while the reaction is in progress, or those which are readily eliminated after its completion. For example, organic powders that mechanically separate the reactant groups from one another may be used (such as, e.g., rubber, resins, etc.); they leave the system entirely while the reaction advances through combustion of volatilization. For example, organic binders which are adsorbed on the surface of the grains may be used (e.g., waxes, higher fatty acids, higher alcohols); they are similarly eliminated. For example, inorganic salts which interpose themselves between reactant groups may be used (e.g., sodium chloride, potassium chloride); they are totally or partially eliminated by decomposition or volatilization, and the residue is readily eliminated by leaching.

Another classification is moderators which do not leave the system. Thus, one may use reaction products that interpose themselves between groups of reactants. This category of moderators remain in the system and may sinter together with reaction products (e.g., alumina). Thus, one may use an excess of metallic oxide; the surplus acts as a moderator; this moderator also remains in the system and may sinter with the products (e.g., excess silica). One may also use compounds which react with the products; these secondary products can take part in subsequent sintering processes (e.g., carbon).

The sixth and seventh steps of the process of this invention were jointly invented by applicants George T. Hida and Jonathan Mironi. In these steps, the composite produced in the first five steps is heat-treated.

The composite material from the fourth sieve of vibratory screen 66 is passed via line 72 to furnace 74, where it is heat-treated. The heat-treated material from furnace 74 is thereafter passed via line 76 to vibratory screen 78.

The heat-treatment occurs in a high-temperature furnace able to reach a temperature in excess of 1,600 degrees centigrade; it is passed via line 72 to furnace 74. Such high-temperature furnaces are well known to those skilled in the art and are described, e.g., on pages 606–612 (and in the references cited in these pages) of the McGraw-Hill Encyclopedia of Science & Technology, Volume 5 (McGraw-Hill Book Company, New York, 1977) the disclosures of which are hereby incorporated by reference into this specification.

High-temperature furnace 74 is preferably a graphite furnace containing a graphite heating element or inductive susceptor; and the heat treatment process is conducted under a protective atmosphere such as nitrogen or an inert atmosphere in the absence of oxygen or oxygen-containing gas. Suitable inert gases include argon, helium, and the like.

After the composite material is charged to the furnace and the furnace is purged with the protective gas, the material is subjected to a specified heat profile. The composite material is first heated from ambient temperature to a temperature of from about 900 to about 1100 degrees centigrade at a rate of from about 8 to about 15 degrees per minute. It is preferred to first heat the composite material from ambient conditions to a temperature of from about 950 to about 1050 degrees centigrade at a rate of from about 10 to about 12 degrees per minute.

In the second step of the heat treatment, the material is raised from its temperature of from about 900 to about 1100 degrees centigrade to a temperature of from about 1250 to about 1250 degrees centigrade at a rate of from about 2 to about 5 degrees per minute. It is preferred to raise it to a temperature of from about 1300 to about 1325 degrees centigrade at a rate of from about 3 to about 4 degrees per minute.

In the third step of the heat treatment, the material may be raised from its temperature of from about 1250 to about 1350 degrees centigrade to a temperature of from about 1550 to about 1650 degrees centigrade at a rate of from about 8 to about 15 degrees per minute. It is preferred to raise the material to a temperature of from about 1600 to about 1630 degrees centigrade at a rate of from about 10 to about 12 degrees per minute.

After the material has been raised to a temperature of from about 1550 to about 1650 degrees centigrade, it may be maintained at such temperature for about at least 30 minutes and, preferably, from about 30 to about 60 minutes. Thereafter, the material is allowed to cool under the protective atmosphere until it reaches ambient temperature. Alternatively, one can induce additional cooling by cooling means in the furnace.

The cooled material is discharged via line 76 to vibratory sieve 78. It is preferred that vibratory sieve 78 be substantially identical to vibratory sieve 66.

The material obtained from the fourth sieve of device 78 is the desired end product.

In another embodiment, the material from vibratory sieve 66 is subjected to an alternative heat treatment cycle under a high-purity nitrogen atmosphere. In this embodiment, the first two steps of the heat treatment cycle are identical to those described above. In the third step, however, the material is raised from its temperature of from about 1250 to about 1350 degrees centigrade to a temperature of from about 1750 to about 1850 degrees centigrade at a rate of from about 5 to 10 degrees per minute. It is preferred to raise the material to a temperature of from about 1750 to about 1800 degrees centigrade at a rate of from about 6 to 8 degrees per minute. After the material has been raised to this elevated temperature, it is maintained at this temperature for from about 90 to about 120 minutes under nitrogen atmosphere. The product obtained in this embodiment is a composite of silicon carbide whiskers in a matrix of aluminum oxynitride powder.

In another embodiment, the composite of silicon carbide whiskers and aluminum oxynitride is subjected to a temperature of from about 1,900 to about 2100 degrees centigrade for from about 90 to about 120 minutes. This further treatment facilitates the separation of the silicon carbide whiskers (which are converted in part to platelets) from the aluminum oxynitride matrix. The aluminum oxynitride so obtained can be used as a replacement for aluminum nitride, for example. It can also be used to replace spinel. In one embodiment, the aluminum oxynitride is shaped into different green bodies by injection molding and/or hot die casting under low pressure and then fired to about 1,600 degrees centigrade under nitrogen atmosphere.

In another embodiment, the composite material from vibratory sieve 78 is subjected to froth flotation in order to separate the aluminum oxide from the silicon carbide whiskers. In this froth flotation separation process, one uses an ionic surfactant which will cause the silicon carbide whiskers to disperse in solution form a stable suspension while causing the aluminum oxide powder to agglomerate and precipitate.

In one embodiment, any or all of the silicon carbide whisker composites of this invention are formed into shaped bodies with an interstitial porosity of from about 50 to about 80 volume percent, which bodies have sufficient strength to be manipulated and subjected to liquid infiltration of molten metals. The silicon carbide whisker composite can be formed into such porous body by cold isostatic pressing, by hot die casting under low pressure, or by injection molding. The green bodies so formed are then fired at a temperature of from about 1300 to about 1500 degrees centigrade for from about 1 to about 2 hours. The porous bodies thus formed can then be infiltrated with molten alloy metals such as, e.g., aluminum based alloys, magnesium based alloys, titanium based alloys, nickel based alloys, and the like. The infiltrated bodies represent a class of metal-matrix composites reinforced by a ceramic phase.

In one preferred embodiment, a structural ceramic body with improved fracture toughness, wear resistance, and abrasiveness is provided. In this embodiment, the silicon carbide whisker composite from vibratory sieve 66 and/or 78 is transferred to a mold and subjected to hot-pressing at a temperature of from about 1600 to about 1700 degrees centigrade and a pressure of from about 200 to about 600 atmospheres. Alternatively, and/or additionally, one my use hot isostatic pressing at a temperature of from about 1300 to about 1500 degrees centigrade and a pressure of from about 1,000 to about 2,000 atmospheres for from about 30 minutes to about 2.0 hours.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

We claim:

1. A process for preparing a ceramic composite which is comprised of alpha silicon carbide whiskers and alpha aluminum oxide powder, comprising the steps of sequentially:
    (a) providing a slurry comprised of from about 80 to about 92 volume percent of solid material and from about 20 to about 8 volume percent of non-aqueous liquid, wherein:
        1. said solid material comprises from about 17 to about 22 weight percent of aluminum material, from about 19 to about 24 weight percent of amorphous carbon, and from about 56 to about 65 weight percent of silica;
        2. said aluminum material has a specific surface area of from about 0.2 to about 1.1 square meters per gram, has a particle size distribution which ranges from about 4 to about 28 microns, and has at least 80 weight percent of its particles being in the range of from about 6 to about 12 microns;
        3. said amorphous carbon has a specific surface area of at least 4 square meters per gram;
        4. said silica has a specific surface area of from about 1.2 to about 400 square meters per gram;
        5. said non-aqueous liquid is volatile at a temperature of 80 degrees centigrade;
        6. said slurry is comprised of from about 1 to about 5 weight percent of a source of carbon monoxide which, when it is subjected to a temperature of from about 700 to about 1,600 degrees centigrade, generates carbon monoxide;
        7. said slurry is comprised of from about 1 to about 5 weight percent of a source of hydrogen fluoride which, when subjected to a temperature of from about 200 to about 400 degrees centigrade, generates hydrogen fluoride;
    (b) pelletizing said slurry to provide a multiplicity of pellets comprised of from about 80 to about 92 volume percent of solids;
    (c) drying said pellets to a moisture content of from about 0.1 to about 2.0 weight percent;
    (d) preheating said dried pellets to a temperature of from about 200 to about 300 degrees centigrade;
    (f) igniting said pellets, thereby producing a composite comprised of alpha silicon carbide and alumina;
    (g) heating said composite to a temperature of from about 900 to about 1,100 degrees centigrade at a rate of from about 8 to about 15 degrees per minute; and
    (h) raising the temperature of said composite from about 900 to about 1,100 degrees centigrade to a temperature of from about 1,250 to about 1,350 degrees centigrade.

2. The process as recited in claim 1, wherein said slurry is pellitized by seiving, and wherein, after said composite has been raised from a temperature of from about 1,250 to about 1,350 degrees centigrade, it is raised to a temperature of from about 1,550 to about 1,650 degrees centigrade at a rate of from about 8 to about 15 degrees centigrade per minute.

3. The process as recited in claim 2, wherein said slurry is pelletized by being passed through a twin-deck sieve, wherein the top sieve has sieve openings of from about 8 to about 14 millimeters; and the bottom sieve has sieve openings smaller than those of the top sieve but no smaller than about 4 millimeters.

4. The process as recited in claim 3, wherein said dried pellets are preheated by being contacted with hot nitrogen at a temperature of from about 300 to about 400 degrees centigrade, and wherein, after said composite has been raised to a temperature of from about 1550 to about 1650 degrees centigrade, it is maintained at such temperature for at least about 30 minutes.

5. The process as recited in claim 1, wherein said source of carbon monoxide is a fatty acid containing from about 10 to about 24 carbon atoms.

6. The process as recited in claim 1, wherein said source of hydrogen fluoride is selected from the group consisting of potassium hydrogen fluoride, sodium hydrogen fluoride, and ammonium hydrogen fluoride.

7. The process as recited in claim 6, wherein said source of hydrogen fluoride is potassium hydrogen fluoride.

8. The process as recited in claim 1, wherein said non-aqueous liquid is selected from the group consisting of acetone, benzene, toluene, and n-petroleum ether.

9. The process as recited in claim 1, wherein said dried pellets are preheated for from about 10 to about 40 minutes.

10. The process as recited in claim 9, wherein said dried pellets are preheated for from about 15 to about 25 minutes.

* * * * *